United States Patent
Xu et al.

[19]

[11] Patent Number: 6,005,854

[45] Date of Patent: Dec. 21, 1999

[54] SYNCHRONOUS WIRELESS ACCESS PROTOCOL METHOD AND APPARATUS

[75] Inventors: Guanghan Xu; Yucong Gu; Wei Chen; Ying Chen; Peiwei Wang, all of Austin, Tex.; Shihe Li, Beijing, China

[73] Assignee: Cwill Telecommunication, Inc., Austin, Tex.

[21] Appl. No.: 08/908,914

[22] Filed: Aug. 8, 1997

[51] Int. Cl.⁶ .................................................. H04J 13/00
[52] U.S. Cl. ........................................... 370/335; 370/350
[58] Field of Search .................................... 370/312, 328, 370/329, 335, 336, 337, 342, 345, 347, 350, 441, 442, 443, 503, 515; 455/575, 450, 509, 517

[56] References Cited

U.S. PATENT DOCUMENTS 4,630,283  12/1986  Schiff .
5,103,459  4/1992  Gilhousen et al. .
5,309,474  5/1994  Gilhousen et al. .
5,345,467  9/1994  Lomb et al. .
5,416,797  5/1995  Gilhousen et al. .
5,455,822  10/1995  Dixon et al. .

*Primary Examiner*—Huy D. Vu
*Attorney, Agent, or Firm*—Michael J. DeLuca

[57] ABSTRACT

A wireless communication system has a protocol enabling synchronous code division multiple access (CDMA) communication on a time division duplex (TDD) frequency, and provides for a smart antenna system as an integral component of the system. The protocol has downlink time slots (DTS) which provide for synchronization and paging of all remote terminals from a base station on a omnidirectional code channel and while providing for traffic signals on directional traffic channels. The protocol has uplink time slots (DTS) which enable rapid link requests by remote terminals, as well as enabling improved spacial estimation, synchronization and power control of remote terminals by the base station.

13 Claims, 10 Drawing Sheets

SYNCHRONOUS WIRELESS ACCESS PROTOCOL METHOD AND APPARATUS

FIELD OF THE INVENTION

This invention relates to a wireless communication system. More particularly this invention relates to a synchronous code division multiple access (CDMA) communication system for wireless communication networks including wireless local loop, cellular telephony, personal communication services and wireless data networks.

BACKGROUND OF THE INVENTION

CDMA wireless communication systems allow multiple remote terminals to use multiple code channels modulated upon a common carrier frequency to communicate with a base station. CDMA systems have several advantages over alternative wireless approaches such as time division multiple access (TDMA) or frequency division multiple access (FDMA). CDMA system channel capacity can be higher and there is an improvement in multipath fading. However, systems which use frequency division duplex (FDD) to provide for 2 way wireless communication suffer from differing multipath environments on uplink and downlink communication frequencies. Smart antenna systems can improve communication between a base station and a remote terminal by providing additional robustness to CDMA "coding gain". The additional robustness is provided by directing each downlink signal toward corresponding remote terminal thereby reducing interfering signals received at one remote terminal intended for another remote terminal. The different multipath environments of the uplink and downlink deter optimization of a smart antenna based communication system. Thus, what is needed is a smart antenna CDMA communication system which provides for a common frequency for both uplink and downlink communications. Also what is needed is a communication system which enables improved spacial estimations of a remote terminal in order to improve the directional characteristics of a smart antenna.

Synchronous CDMA systems provide improved coding gain over asynchronous CDMA systems. However, synchronization signals can use significant bandwidth or require complex processing in the base station or remote terminal, thereby increasing the cost of the communication system. Thus, what is needed is a communication system which provides synchronous CDMA communication on both the uplink and downlink communication channels without adding significant cost or bandwidth to the communication system.

In a typical communication system, base station signals may be received by numerous remote terminals, while only a few remote terminals are communicating information with the base station. However, when a call is initiated, it is desirable that the link between the remote terminal and the base station be established as quickly as possible. Therefore what is needed is a CDMA communication system which provides for rapid establishment of a communication link between a remote terminal and a base station. Two remote terminals attempting to simultaneously establish a link may cause collision interference at the base station, therefore what is needed is a communication system which efficiently addresses recovery from such collisions. Furthermore, during the establishment of the communication link, large course adjustment in synchronization and power levels of the remote terminal should be provided. However, once the link is established smaller fine adjustments of synchronization and power control if used, would reduce overhead. However, the large course adjustment signals use more channel capacity than needed once a link is established and consequently waste channel capacity. Thus, what is needed is a communication system which reduces the channel capacity used to synchronize a remote terminal once a link is established.

OBJECTS OF THE INVENTION

Objects of the invention include providing for the aforementioned needs.

DESCRIPTION OF A PREFERRED EMBODIMENT

Figure 1:
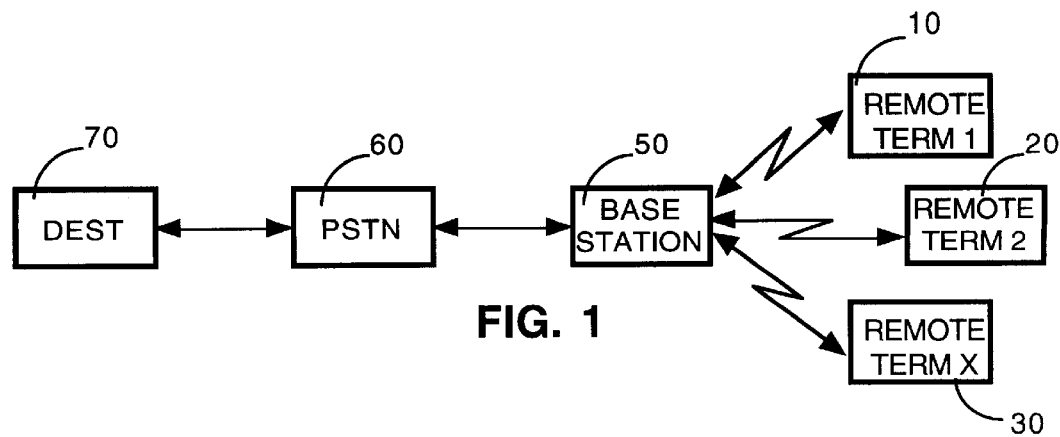
FIG. 1 shows a block diagram of a communication system operating in accordance with the present invention.

FIG. 1 shows a block diagram of a communication system operating in accordance with the present invention. A plurality of remote terminals 10, 20 and 30, are wirelessly coupled to a base station 50 which interfaces to a public switched telephone network (PSTN) 60 and a destination 70. A base station controller (not shown) may be interposed between the PSTN 60 and a plurality of base stations, including base station 50, to coordinate the operation of the plurality of base stations. In a typical application a user at the destination engages in a full duplex voice communication with a user of a remote terminal. In alternate embodiments, either destination or remote can communicate digital information, such as FAX or modem information between computers. Also, the PSTN itself may be a destination for some of the information, such as control signals like dual tone multiple frequency (DTMF) signals, generated by a remote terminal.

The wireless interface between the base station and a remote terminal uses a synchronous code division multiple access protocol (S-CDMA). In a S-CDMA system a plurality of concurrent code channels are modulated upon a common carrier frequency. The communication system of the present invention uses time division duplex (TDD), the carrier frequency is divided into time slots for downlink communications (base station to remote terminals) via downlink time slots (DTS) and for uplink communications (remote terminals to base stations) via uplink time slots (UTS). The communication system of the present invention takes advantage of the identical RF propagation paths of the downlink and the uplink due to TDD to implement an improved smart antenna beam forming base station for generating directional radiation patterns from an antenna array included in the base station. Although the preferred embodiment is described with respect to a TDD CDMA system, the invention is not limited thereto. Inventions herein may also be applied to frequency division duplex (FDD) and/or time division multiple access (TDMA) and/or other systems.

Figure 2:
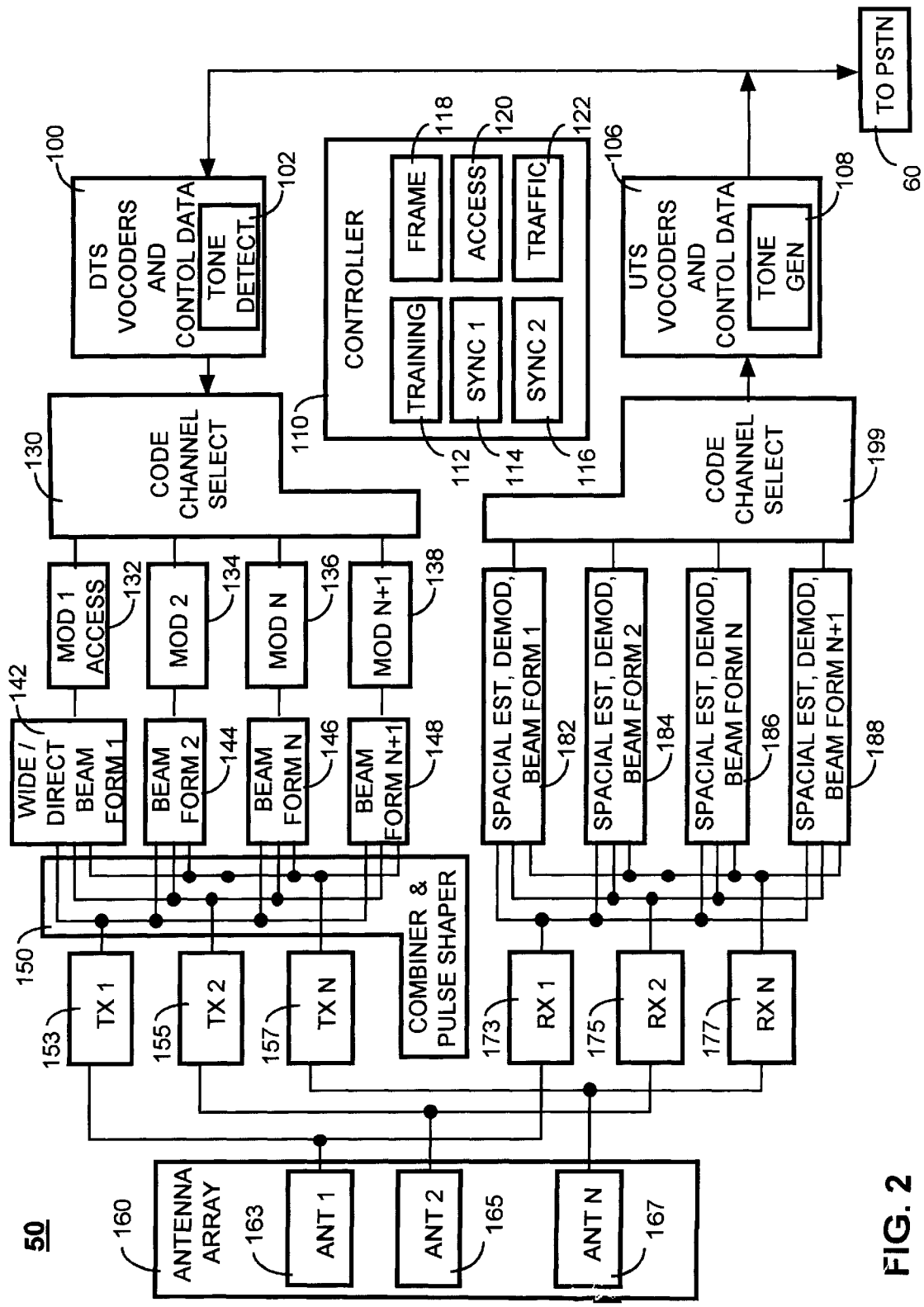
FIG. 2 shows a block diagram of a base station in accordance with the present invention.

FIG. 2 shows a block diagram of base station 50 in accordance with the present invention. Information is received for use in a DTS frame by DTS vocoders and control data generator 100 from a destination through the PSTN, 60. Included therein are at least one vocoder for each code channel supported by the base station for digitizing voice signals. Vocoders are well known in the art and a 8 Kbps fixed rate vocoder ITU Rec. G.729 may be preferably used. Preferably all vocoders used in this invention for both uplink and downlink communication are of the same type. In alternate embodiments, variable rate or alternate methods of digitizing voice and presenting a time variable representation of the signal received from the PSTN may be used. Also included is a control data generator for generating and transmitting control data in both a DTS access channel and a DTS traffic channel as described in more detail hereinafter. Also included is a tone detector 102 for detecting DTMF or other control tones received via the PSTN, and creating a signal indicative of the frequency thereof. The tone is then replaced with a digital control signal indicative of the frequency components of the tone. By this method, a better representation of the control tone or tones may be regenerated at a remote terminal without introduction of distortion by a vocoder. In alternate embodiments other signal detectors may be substituted for detector 102 for detecting the presence of FAX or computer modem signals and regenerating digital representations thereof.

Information is received and demodulated from remote terminals 10–30 in a UTS frame and presented to UTS vocoders and control data generator 106. The converted information is then made available to the destination through the PSTN 60. Included therein are at least one vocoder for each code channel supported by the base station for digitizing voice signals. Also included is a control data interpreter for responding to control data received in both a UTS access channel and a UTS traffic channels as described in more detail hereinafter. Also included is a tone generator 108 for generating DTMF or other control signals originating at remote terminals, and creating a signal indicative of the frequency thereof for the PSTN. By this method, a better representation of the control tone or tones may be regenerated and sent to or through the PSTN without introduction of any vocoder distortion.

Controller 110 controls and coordinates the operation of the elements of base station 50, and includes training signal generator 112, sync 1 processor 114, sync 2 processor 116, frame number generator 118, UTS and DTS access channel processors 120, and UTS and DTS traffic channel processors 122. The operation of these elements will be described in more detail hereinafter.

Code channel selector 130 directs information from DTS vocoders and control data 100 to the at least N+1 modulators 132–138 for use on the at least N+1 code channels of the base station. The access channel is shown directed to modulator 1, 132. The traffic channels are directed to remaining modulators 134–138. Modulators 132–138 modulate each channel with a unique orthogonal spreading code in a manner known to those familiar with CDMA art. The output of each modulator is coupled to a corresponding beam former 142–148 which modulates the power and phase of each channel for each element of antenna array 160 and on the code channel on the common carrier frequency. The array of beam formers 142–148 generates a unique radiation pattern for each code channel for directing signals toward each corresponding remote terminal. This has the advantage of reducing the interference of DTS frames of one remote terminal interfering with DTS frames of another remote terminal. This reduction of interference significantly improves the robustness of the communication system and the quality of the signal received by each remote terminal. The outputs of each beam former 142–148 are concurrently combined and pulse shaped to shape the transmitted signal spectrum by combiner and pulse shaper 150. Combiner and pulse shaper 150 combines and shapes outputs of beam formers 142–148 for antenna 1, 163 and couples them to transmit amplifier 1, 153. Similarly, combiner and pulse shaper 150 combines and shapes outputs of beam formers 142–148 for antenna 2, 165 and couples them to transmit amplifier 2, 155. Similarly, combiner and pulse shaper 150 combines and shapes outputs of beam formers 142–148 for antenna N, 167 and couples them to transmit amplifier N, 157. Note that bream former 142, for the access channel, transmits both a wide area radiation pattern and a directional radiation pattern, the purpose of which will be described herein.

N receivers 173–177, coupled to corresponding N antenna 163–167, receive and demodulate information from remote terminals in UTS frames. There are at least N+1 spacial estimation, demodulation and beamformers 182–188 for processing CDMA code channels received on each of the N antennas of the antenna array 160. Demodulation includes despreading each received code channel from each antenna using a predetermined orthogonal P/N code. Spacial estimation, demodulation and beamformer 1, 182, is used for receiving the UTS access channel and spacial estimation, demodulation and beamformers 2 through N+1 are used for receiving UTS traffic channels. Spacial estimation, demodulation and beamformers 182–188 analyze the power and phase of each code channel received on each antenna during a UTS frame. The processed information is then made available to corresponding beam formers 142–148 for generating directional radiation patterns in DTS frames. Alternate methods of beam forming are described in detail in co-pending U.S. patent application entitled S-CDMA Smart Antenna System, Ser. No. 08/768,100 filed Dec. 6, 1996 and assigned to the assignee of the present invention which is hereby incorporated by reference. The output of each spacial estimation, demodulation and beamformer is coupled to UTS vocoders and control data 106 via code channel selector 199 for communication with the PSTN 60.

In a preferred embodiment, N=eight, thus there are eight: transmitters 153–157; antennas 163–167 of antenna array 160; and receivers 173–174. Further, the at least N+1=thirty two, thus there are thirty two modulators 132–138, beam formers 142–148, spacial estimation, demodulation and beamformers 182–188 allowing for thirty two CDMA code channels comprising one access channel and thirty one traffic channels.

In the preferred embodiment, the bulk of the process in the base station are implemented by software operating on an array of digital signal processors (DSPs), including devices 100 through 150 and 182 through 199.

Figure 3:
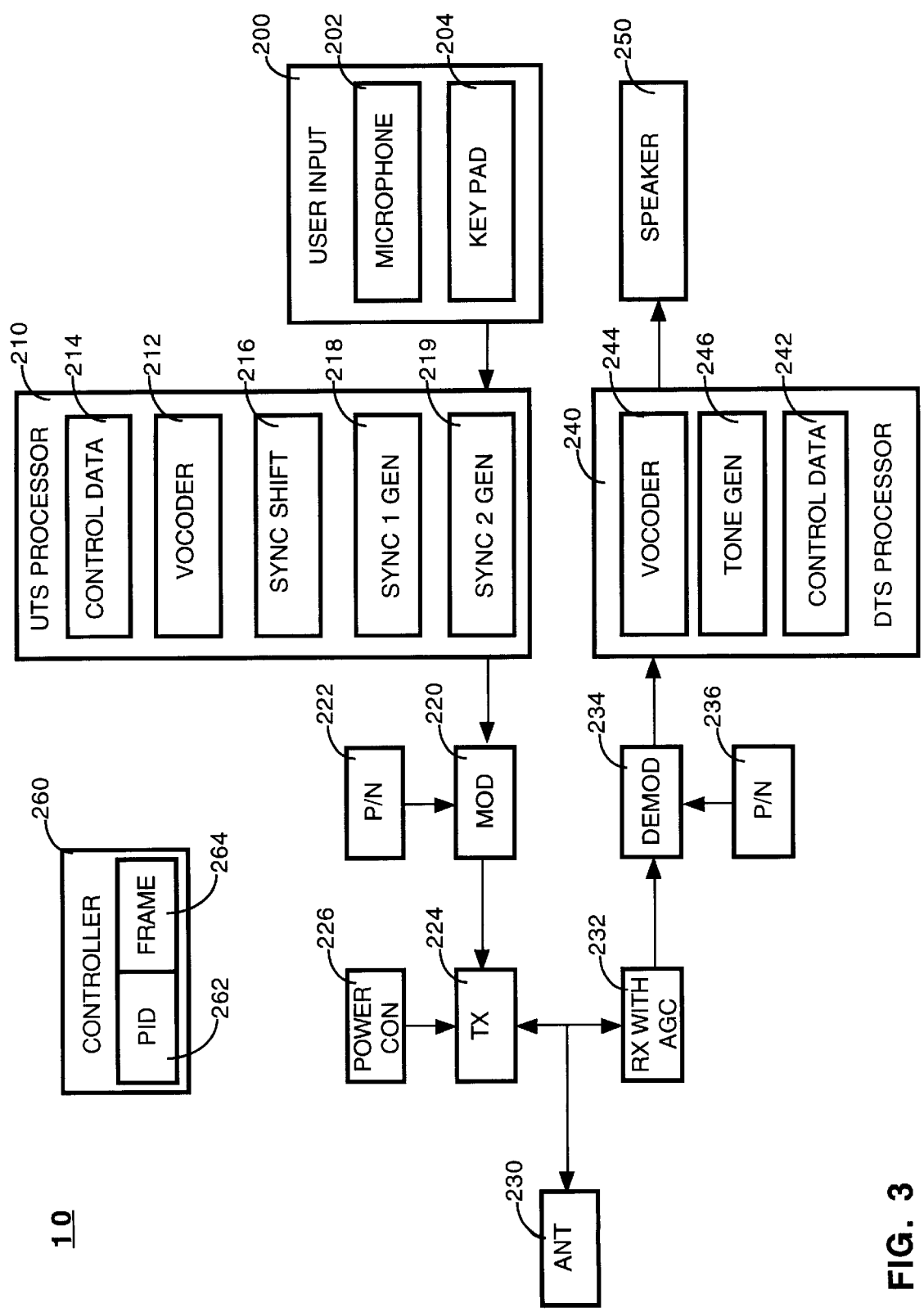
FIG. 3 shows a block diagram of a remote terminal operating in accordance with the present invention.

FIG. 3 shows a block diagram of a remote terminal operating in accordance with the present invention. A user input means 200 allows a user of the remote terminal 10 to input both voice signals via microphone 202, and dial phone numbers via key pad 204. User input means may also receive signals from data devices such a FAX or computer modem signals. User input means 200 is coupled to UTS processor 210 for causing transmission of a UTS frame by the remote terminal. Microphone 202 is coupled to vocoder 212 for generating a digital representation of the time variable voice signals. Key pad 204 is coupled to control data means 214 for generating a digital representation of the frequency domain control tones corresponding to the DTMF tones resulting from user activating key pad 204. FAX and computer modem signals may also be received and processed by control data means 214. Additionally, sync shift 216 data is processed, and sync 1 and sync 2 are generated, 218 and 219. UTS frames are then modulated by modulator 220, which spreads the UTS frame on a code channel in accordance with P/N code 222. Modulator 220 modulates the code channel on the common carrier frequency used concurrently by other remote terminals UTS frames. Transmitter 224 then amplifies the output of the modulator at a power level set by power control 226. The output of transmitter 224 is then coupled to antenna 230 for wireless communication with base station 50.

DTS frames are received by antenna 230 and receiver 232 which may include gain control means for automatically regulating the gain of the receiver. Demodulator 234 then despreads the received signal to recover a desired code channel in accordance with P/N 236. The power of the received signal is also determined by receiver 232 and demodulator 234. The demodulated DTS frame is then processed by DTS processor 240 which processes control data 242 from the base station, and traffic information is presented to vocoder 244 which generates an audio output via speaker 250 generates which may be recognized by the user in voice communication with another at the desired destination. Control data means 242 may also provide a FAX or computer modem signals. DTS processor also has a tone generator 246 for generating tones on speaker 250 corresponding to either key pad 204 being pressed or control data received in a DTS frame. Remote terminal 10 also includes a controller 260 having a personal identification (PID) uniquely assigned to the remote terminal, and a frame number assigned to the remote terminal in a signal included in a DTS frame. Preferably, the UTS processor 210, modulator 220, P/N 222, power control 226, demodulator 234, P/N 236, DTS processor 250 and controller 260 are substantially implemented by software operating with a DSP within the remote terminal.

Figure 4:
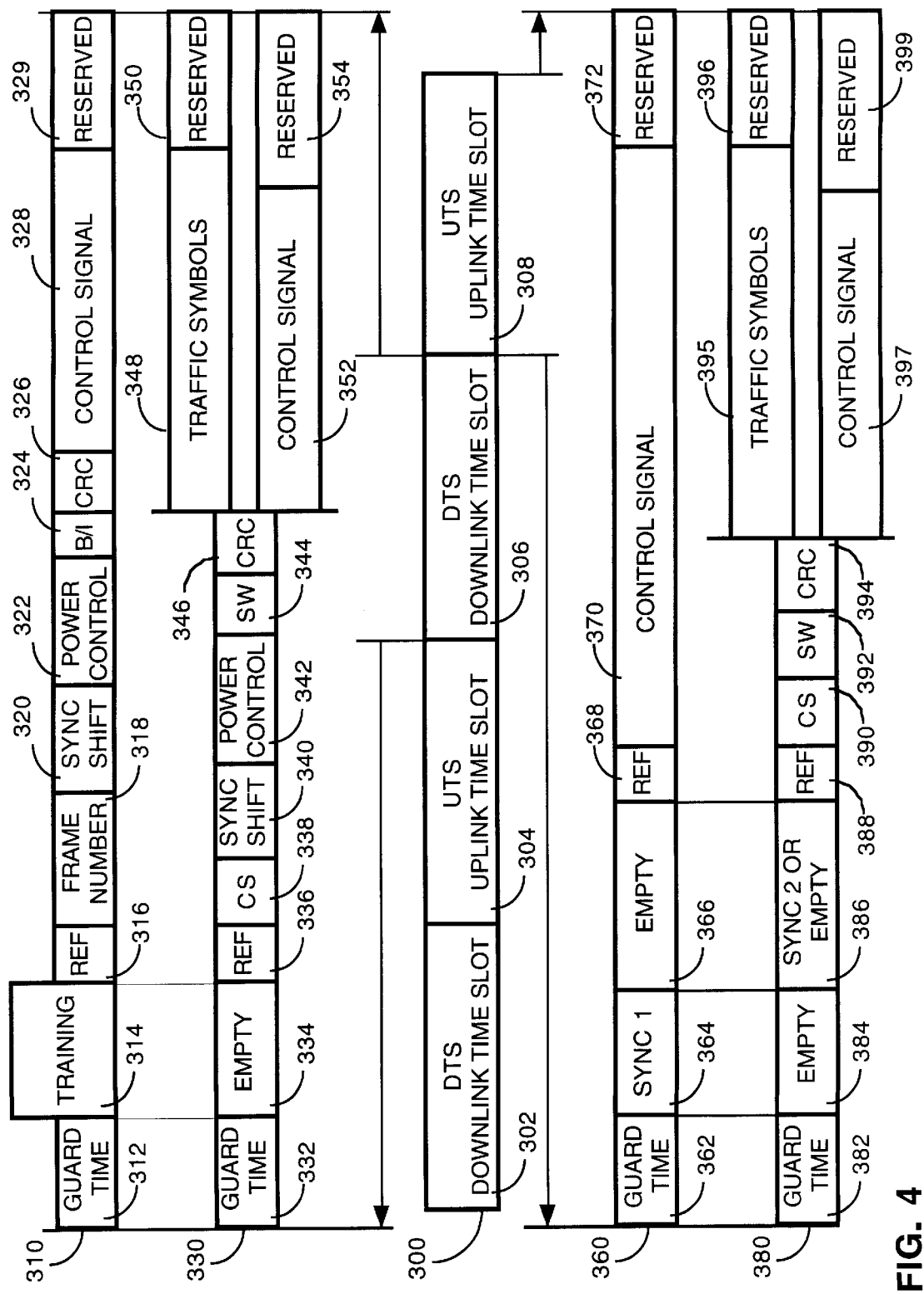
FIG. 4 shows a protocol format in accordance with the present invention.

FIG. 4 shows a protocol format in accordance with the present invention. Line 300 shows four frames, 302–308, divided into time slots. Downlink time slots (DTS) frames 302 and 306 are for communication from the base station to the remote terminals, and uplink time slots (UTS) frames 304 and 308 are for communication from the remote terminals to the base station. Within the frames of line 300 are the concurrent code channels modulated upon a common carrier frequency which enable the TDD CDMA communication system.

Preferably each UTS and DTS frame is substantially 5 mS in duration and consists of sixty four digital symbols modulated using differential quadrature phase shift keying (DQPSK), at two bits per symbol. Alternately, other frame durations and symbol modulations such as FSK or QAM may be used. Each symbol is spread by a P/N chip sequence, preferably the chip sequence used on each code channel is a 32 bit orthogonal code.

Line 310 shows the protocol format of the DTS access channel of frame 306. The access channel 310 is modulated using a predetermined spreading code or P/N sequence. Guard time field 312 allows for RF propagation delays between the base station and the remote terminal and is preferably five symbols in duration. The base station is not transmitting during the guard time field. Training signal field 314 is provided to allow remote terminals to synchronize to the training signal in the UTS frame. The training signal is preferably 15 dB higher in RF power than the rest of the symbols of the access channel and is four symbols in duration. Reference field 316 is one symbol having a predetermined value and may be used to facilitate DQPSK demodulation, the predetermined value is preferably "11". Frame number field 318 is a signal identifying each frame. Preferably, there are thirty two frames, the frame number ranging from zero to thirty one, and the frame number field is three symbols in duration. The sync shift field 320 provides timing information for use by a remote terminal in transmission of a UTS frame. Sync shift information enables substantially synchronized arrival of all UTS frames at the base station from all remote terminals in communication with the base station, even though the the remote terminals are at varying distances from the base station thereby having variable propagation delays. Preferably the sync shift field 320 is five and one half symbols in duration allowing for +/− thousand and twenty four steps of adjustment at one sixteenth of a chip period per step. Power control field 322 provides for course power adjustment of the transmitter of a remote terminal during link acquisition. This allows the base station to regulate the power of the UTS frames received from each of the remote terminals. Preferably power control field 322 is three symbols allowing an adjustment of +/− thirty two steps at one dB per step. The B/I field 324, busy/idle, indicates the availability of traffic code channels for remote terminals attempting to initiate communication with the base station. It is preferably one half symbol in duration. A cyclic redundancy code (CRC) field 326 assures validity of prior fields 318, 320, 322 and 324 and is preferably three symbols in length. Control signal field 328 is used to communicate information to remote terminals. The information includes a link access paging signal having information corresponding to a unique personal identification (PID) assigned to a remote terminal for communicating a call originating from the PSTN and a corresponding link grant signal. Other information includes base station identification, channels used, information about adjacent base stations, as well as information which may be useful to users of the remote terminals such as time of day and weather information. Preferably the control signal field 328 is thirty six symbols in duration. Finally, reserved field 329 is left for future definition.

Line 330 shows the protocol format of the DTS traffic channel of frame 306. Preferably there are up to thirty one concurrent orthogonally modulated traffic channels plus the concurrent access channel 310 having a common carrier frequency within a DTS frame. Guard time 332 corresponds to guard time 312 of the access channel. Empty slot 334 corresponds to the occurrence of training signal 314. The traffic channels 330 are not modulated during empty field 334 while the training signal 314 is being modulated upon the access channel. This has the advantage of allowing remote terminals to synchronize to the training signal on the DTS access channel prior to receiving information on their DTS traffic channel. Reference signal 336 is one symbol having a predetermined value and may be used to facilitate DQPSK demodulation. Preferably the value of reference signal 336 is predetermined and preferably a "11". Control signal (CS) field 338 contains a portion of a complete control signal and is preferably four symbols in duration. Sync shift field 340 is a reduced version of sync shift field 320 of the access channel. The access channel allows for course adjustment of the synchronization of a remote terminal while the traffic channel allows for fine adjustment of synchronization. The fine adjustment field 340 has the advantage of allowing for more information to be used in other fields and reduces the amount of sync adjustment that may be done when a remote terminal is receiving a traffic channel. Preferably synch shift 340 is one symbol in duration allowing for: no change in synchronization, or a +1, −1 or −2 leading step wherein a step is one sixteenth of a chip. Power control field 342 is a reduced version of power control field 322 of the access channel. Preferably power control 342 is two symbols in duration allowing for: no change in synchronization, or up to +7 steps, up to −8 steps in transmit power adjustment wherein a step is one dB. The reduce version has the advantage of allowing for more information to be used in other fields of the traffic channel and reduces the amount of adjustment that may be done when a remote terminal is receiving a traffic channel. Thus, the access channel allows for a one time course adjustment of the sync shift and transmit power of a remote terminal while the traffic channel has the advantages of both allowing for more frequent, substantially once every ten milliseconds, fine adjustments of synchronization and transmit power, and being smaller in size to improve the throughput of information to the remote terminal. Although the step size of the course sync shift 320 and power control 322 fields are shown equivalent to the step size of the fine sync shift 340 and power control fields 342, alternate embodiments may reduce the step size of the fine sync shift and power control fields relative to the course adjustment to further enhance the accuracy of the system.

The SW field 344 indicates the structure of the information following CRC field 346, which may be either traffic signals produced by a vocoder in the base station, or any of several types of control signals. Preferably the SW field is one symbol indicating either traffic symbols, or whether DTMF or other control information such as call termination or cell handoff information is included in the control signal. Cyclic redundancy code (CRC) field 346 assures validity of prior fields 338–344 and is preferably one symbol. When the SW field 344 indicates that traffic symbols follow CRC 346, traffic symbols field 348 follows and includes information used by a vocoder in a remote terminal to produce audio signals. Preferably the traffic symbols field 348 is forty three symbols in length. Reserved field 350 is for future definition. When the SW field 344 indicates that control signals follow CRC 346, control signal field 352 follows and includes the type of information previously described. Preferably the control signal field 352 is thirty six symbols in length. Reserved field 354 preferably is for future definition. Note that when SW indicates traffic symbols 348 are transmitted, information that may have been sent in control signal 352 may alternately be distributed in nine occurrences of the CS field 338 in nine DTS frames.

Thus, lines 310 and 330 of FIG. 4 show a data protocol format in a wireless communication system of FIG. 1, the data protocol format for communicating from a base station 50 of FIG. 2 to a plurality of remote terminals 10, 20 and 30 on a plurality of concurrent code channels 310 and 330 modulated upon a common carrier frequency. The data protocol format comprises an access channel 310 modulated upon a first of the plurality of code channels. The access channel includes a synchronization portion 314 and a control portion 316–329 following said synchronization portion. The traffic channel 330 modulated upon a second of the plurality of code channels includes a null portion 334 occurring concurrently with said synchronization portion 314 and a traffic portion 336–350 or 336–354 occurring concurrently with said control portion.

Line 360 shows the protocol format of the UTS access channel of frame 308. In a UTS frame remote terminals transmit signals received by the base station. A predetermined spreading code is used when transmitting on the UTS access channel. Guard time 362 has a similar function as described with respect to guard time 312. Sync 1 field 364 is for use by remote terminals attempting to establish communication with the base station, and is a predetermined pattern preferably three symbols in length. After sync 1, 364, is an empty slot, 366, where the transmitter of a remote terminal attempting to access the base station is shut off. Thereafter, a reference signal 368 consists of one symbol having a predetermined value and may be used to facilitate DQPSK demodulation, the predetermined value may preferably be a "11". Control signal 370 includes information from the remote terminal attempting to access the base station. Such information includes a link request signal, the PID of the remote terminal and the priority of a call initiated at the remote terminal. An example of priority is whether the call is a high priority "911" or a normal priority call. Preferably the control signal field 370 is thirty six symbols in duration. Reserved field 372 is for future definition.

Line 380 shows the protocol format of the UTS traffic channel of frame 308. Preferably there are up to thirty one concurrent orthogonally modulated traffic channels transmitted by up to thirty one remote terminals plus the concurrent access channel 360 having a common carrier frequency within a UTS frame received by the base station. Guard time 382 corresponds in functionality to guard time 312 of the DTS access channel. Empty slot 384 corresponds to the occurrence of the sync 1 field 364. The traffic channels 380 are not modulated during empty field 384 while the sync 1 signals 364 may be transmitted upon the access channel. This has the advantage of allowing the base station to synchronize to the sync 1 signals of a remote terminal which has not yet received sync shift and power control signals from the base station. The absence of concurrent traffic channels during the sync 1 field enables the the base station to more accurately perform power control, sync shift and spacial estimations on the remote terminal. Furthermore, a remote terminal may attempt to establish a link on any UTS frame allowing for quicker link establishment between the base station an the remote terminal. Thereafter, a sync 2 field 386 enables a selected remote terminal to transmit a synchronization signal. Preferably a remote terminal transmitting in this field is selected by frame number, more particularly by an index that is indicative of both the frame number and the spreading code to use for communicating on a code channel assigned by the base station. Thus, only one remote terminal is transmitting during the sync 2 field even though up to thirty one remote terminals may be communicating on the thirty one code channels for UTS traffic. In alternate embodiments multiple remote terminals may concurrently transmit sync 2 signals to a common base station in a single UTS frame. For example, sixty four code channels could be incorporated into a thirty two frame protocol if only the five most significant bits of the index of the sixty four code channels were used to select a frame for transmitting in a sync 2 field. In this example, remote terminals having a code index of two and thirty four would transmit sync 2 in frame two, while remote terminals with code indexes of zero, one, three through thirty one, and thirty three through sixty three would not transmit sync 2 in frame two. Reference signal 388 is one symbol having a predetermined value and may be used to facilitate DQPSK demodulation, preferably the predetermined value is "11". Control signal (CS) field 390 contains portion of a complete control signal and is preferably two symbols in duration. Similar to the SW field 344 of the DTS frame, the SW field 392 of the UTS frame indicates whether information following the CRC 394 contains traffic symbols 395 or a control signal 397, which are similar in function and preferred size to the corresponding DTS traffic signals 348 and control signal 352. In the event traffic signals 395 are present on a UTS traffic channel, then CRC is calculated based upon fields 392 and 395. Reserved fields 396 and 399 are reserved for future definition.

Lines 360 and 380 show a data protocol format in the wireless communication system of FIG. 1, the data protocol format for communicating from a plurality of remote terminals 10, 20 and 30 to a base station 50 on a plurality of concurrent code channels 360 and 380 modulated upon a common carrier frequency. The data protocol format comprises an access channel 360 modulated upon a first of the plurality of code channels including a first synchronization portion, sync 1 field 364, a first null portion following said first synchronization portion, empty field 366, and a control portion following said first null portion, field 370. Furthermore, a traffic channel 380 is modulated upon a second of the plurality of code channels. Traffic channel 380 includes a second null portion, empty field 384, occurring concurrently with said first synchronization portion, sync 1 field 364. Traffic channel 380 also includes a second synchronization portion, sync 2 field 386, occurring concurrently with said first null portion, empty field 366. Traffic channel 380 also includes a traffic portion, field 395 or field 397, occurring concurrently with the control portion, control signal field 370.

FIG. 4 shows providing a course synchronization signal 320 and 322 for a remote terminal on a first code channel and providing a fine synchronization signal 340 and 342 for the remote terminal on a second code channel.

FIGS. 3 and 4 show a communication system has a plurality of frames 304 and 308 for communication from a plurality of remote terminals to a base station on a common carrier having a plurality of concurrent code channels. Each frame having a first portion corresponding to sync 1 364 and empty 384, a second portion corresponding to sync 2 386 and empty 366, and a third portion including signals 370, 395 and 397. The remote terminal comprises: a controller 260 for controlling operation of the remote terminal in a access mode while receiving access channel 360 and a traffic mode while receiving traffic channel 380; a first synchronization generator 218 responsive to said controller for generating a first synchronization signal; a second synchronization generator 219 responsive to said controller for generating a second synchronization signal; a data modulator 220 responsive to said controller for generating modulated information signals; and a transmitter 224 coupled to said first synchronization generator, said second synchronization generator and said data modulator for generating a radio frequency modulated transmit signal indicative of the first and second synchronization signals and the information signals in response to said controller, wherein, in the access mode, said controller enables said transmitter and said first synchronization generator in the first portion, disables the transmitter in the second portion, and enables said data modulator and said transmitter in the third portion during a first frame, and in the traffic mode, said controller disables said transmitter in the first time slot, enables said transmitter and said second synchronization generator in the second portion, and enables said transmitter and said data modulator in the third portion during a second frame subsequent to the first frame.

Figure 5:
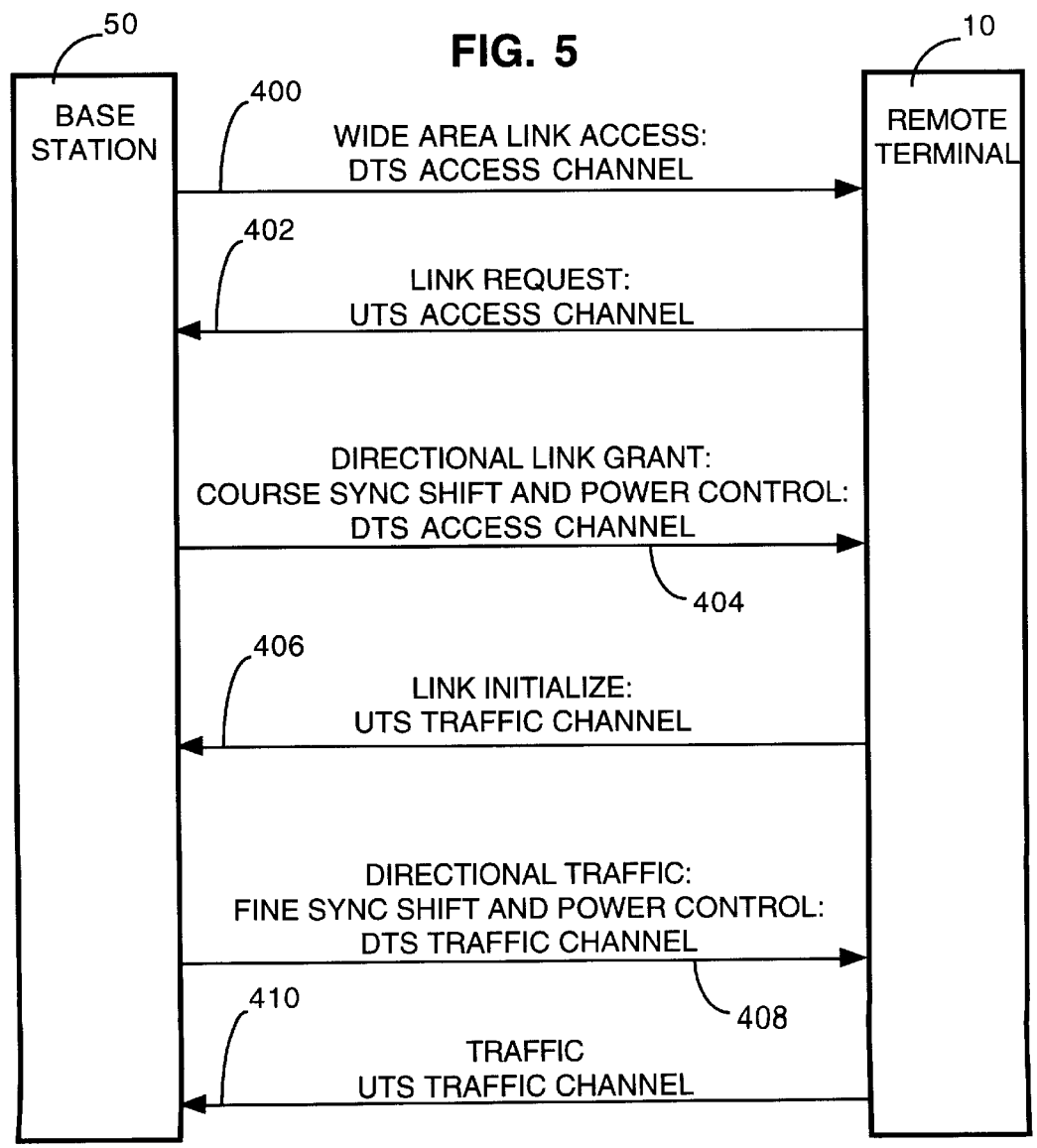
FIG. 5 shows communication between a base station and a remote terminal in establishing and maintaining a communication link in accordance with the present invention.

FIG. 5 shows communication between a base station and a remote terminal for establishing and maintaining a communication link. When a call originates through the base station 50, typically from a destination coupled to the PSTN, the base station transmits a link access signal, or sends a page to the intended remote terminal 10 on the DTS access channel at link 400. The base station has beam forming capabilities but may not have information on the current location or optimal directional beam for communicating with remote terminal 10. Consequently the link access signal is transmitted in a wide area or substantially omnidirectional mode. The remote terminal responds at 402 with a link request signal on the UTS access channel. Alternatively, if a call originates at the remote terminal, the process starts at the link request signal 402. The remote terminal uses the power of the training signal to estimate an initial sync shift and power control level to transmit the link request signal at 402. The base station uses the link request to perform a spacial estimation of the direction of the remote terminal and then transmits a link grant signal on the DTS access channel at 404. The link grant signal directionality is the result of beam forming done by the base station in response to the spacial estimation. Alternatively, the link grant signal may be transmitted omnidirectionally. Additionally, using the received link request signal, the bases station determines an appropriate course sync shift and power control signal. This information is also communicated to the remote terminal in the link grant signal along with an index of an available traffic channel. Thereafter, the remote terminal responds on the available traffic channel in a UTS frame with a link initialize signal at 406. Thereafter traffic information is communicated between the base station and remote terminal in DTS and UTS frames for the duration of the communication at 408 and 410. Additionally, the base station monitors the UTS transmissions from the remote terminal to adjust the directionality of the DTS code channel as well as the sync shift and power control signals for the remote terminal.

FIGS. 6 through 10 show a detailed flow diagram of the operation of a base station and a remote terminal in accordance with the present invention. Beginning at FIG. 6, which indicates a process in a UTS frame, in step 500 the base station transmits the training signal on the access channel in a wide area radiation pattern intended such that all remote terminals in an area covered by the base station may receive the training signal. The training signal is received by the remote terminal at step 502, wherein the remote terminal measures the received power of the training signal as well as using the training signal for synchronization to the rest of the information on the access channel. Then at step 504 the remainder of the access channel for the DTS frame is transmitted in the wide area mode. The remote terminal receives the rest of the access channel information at step 506. A page is checked for at step 508 by determining if a PID matching the PID of the remote terminal is received. The page could also be pending from a prior attempt to establish a link, where the link was not granted. If not paged, step 510 checks to see if a call is being originated at the remote terminal, typically by a user of the remote terminal. The call could also be pending from a prior attempt to establish a link, where the link was not granted. If not the remote terminal returns to step 502 for the next DTS frame.

If a call is originated at step 510, step 512 checks if the originating call is a high priority call, such as a "911" call. If not, step 514 checks if the B/I field indicates available code channels. If not, step 516 invokes a random delay of frames before attempting to establish a communication link. If paged at step 508, or a call is originated at steps 512 or 514, then step 518 sets the transmit sync shift and power control using the received power of step 502. Since the attenuation of the received power may be substantially proportional to the distance of the remote terminal from the base station, the appropriate sync shift may be determined such that information transmitted by the remote terminal on the access channel may arrive at the base station at substantially a correct power level and timing so that the base station may also maintain CDMA communication with other remote terminals on traffic channels. Alternately a prior setting of sync shift and power control received from the base station may be used. The prior setting is advantageous if the remote terminal has had a substantially constant location or the prior setting was recently received.

Figure 6:
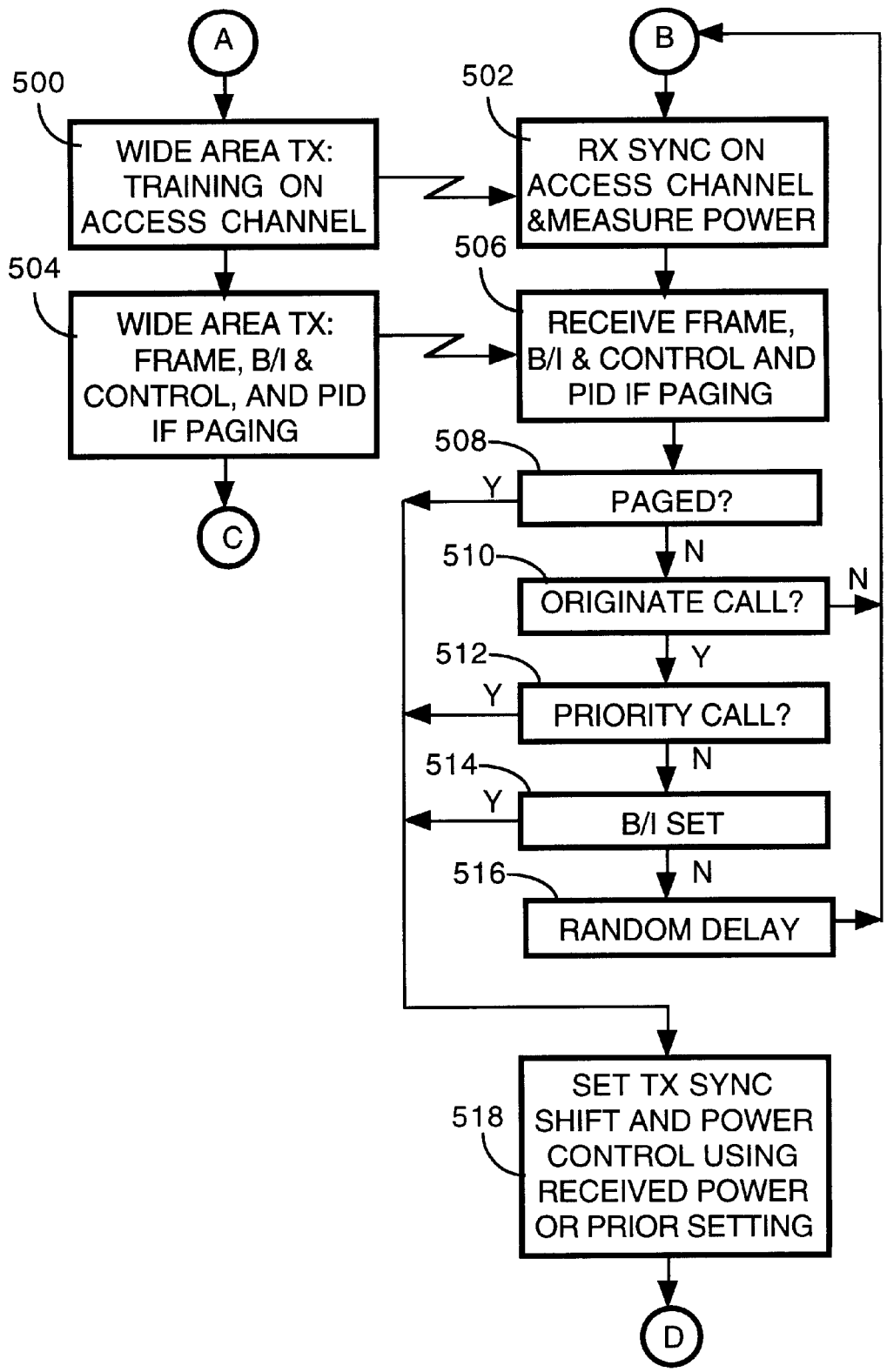
FIGS. 6 through 10 shows a detailed flow diagram of the operation of a base station and a remote terminal in accordance with the present invention.
Figure 7:
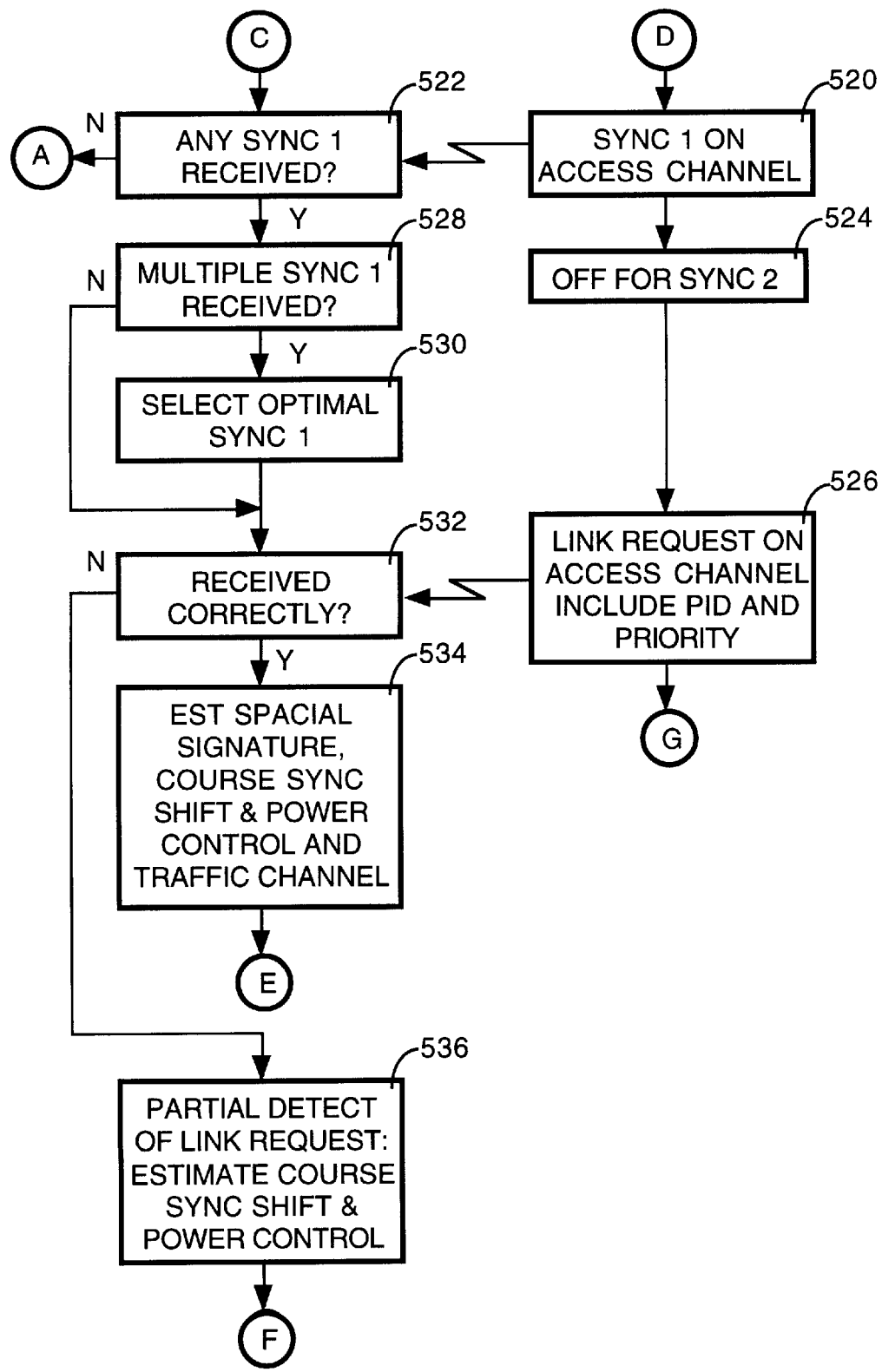

The processes of the remote terminal proceed through connector "D" of FIG. 6 to connector "D" of FIG. 7 indicating process in a UTS frame, where at step 520 a sync 1 signal is transmitted on the access channel at the settings determined as step 518. Then at step 522 the base station proceeds from step 504 through connector "C" to check for any received sync 1 signals. If none are received, either because the remote terminal is out of range or did not transmit a sync 1 signal due to returning to step 502 from either steps 510 or 516, then the base station returns to step 500 through connector "A" to continue generating access channels on DTS frames. The remote terminal powers the transmitter off for the sync 2 field, step 524, and then powers the transmitter on to transmit a link request signal on the UTS access channel, step 526. The link request signal may include the PID of the remote terminal and any priority of a call originating at the remote terminal. Meanwhile, the base station processes the received sync 1 field and determines if more than one remote terminal transmitted a sync 1 signal a step 528. If true, step 530 selects an optimal sync 1 for further processing. Step 530 is defined in more detail at FIGS. 10 and 11. Then at step 532, it is determined if the link request signal sent of step 526 is correctly received. If received, the base station performs an estimate of the spacial signature, determines course adjustment of sync shift and power control and determines an available traffic channel at step 534. If incorrectly received, the link request is partially detected, course sync shift and power control is done on the basis of the received signal at step 536. This step is likely executed as a result of a link request collision where more than one remote terminal is attempting to establish communication with the base station. The partial detection is a result of a selected sync 1 at step 520, but an errored CRC, or other detection of poor signal quality, at step 532.

Note that in the event of a high priority call, such as a user dialing "911", the invention provides a method of establishing communication between a remote terminal and a base station in a communication system for communicating between the base station an a plurality of base stations comprising the steps of: receiving a call signal from a user of the remote terminal indicative of a request to originate communication between the remote terminal and the base station, step 510; determining a priority of the call signal, step 512; transmitting a first priority link request signal in response to the call signal having a first priority, step 526; or determining if the base station has an available channel and generating a channel available signal in response to the call signal having a second priority, step 514; and transmitting a second priority link request signal, step 526, in response to said available channel determination.

Figure 8:
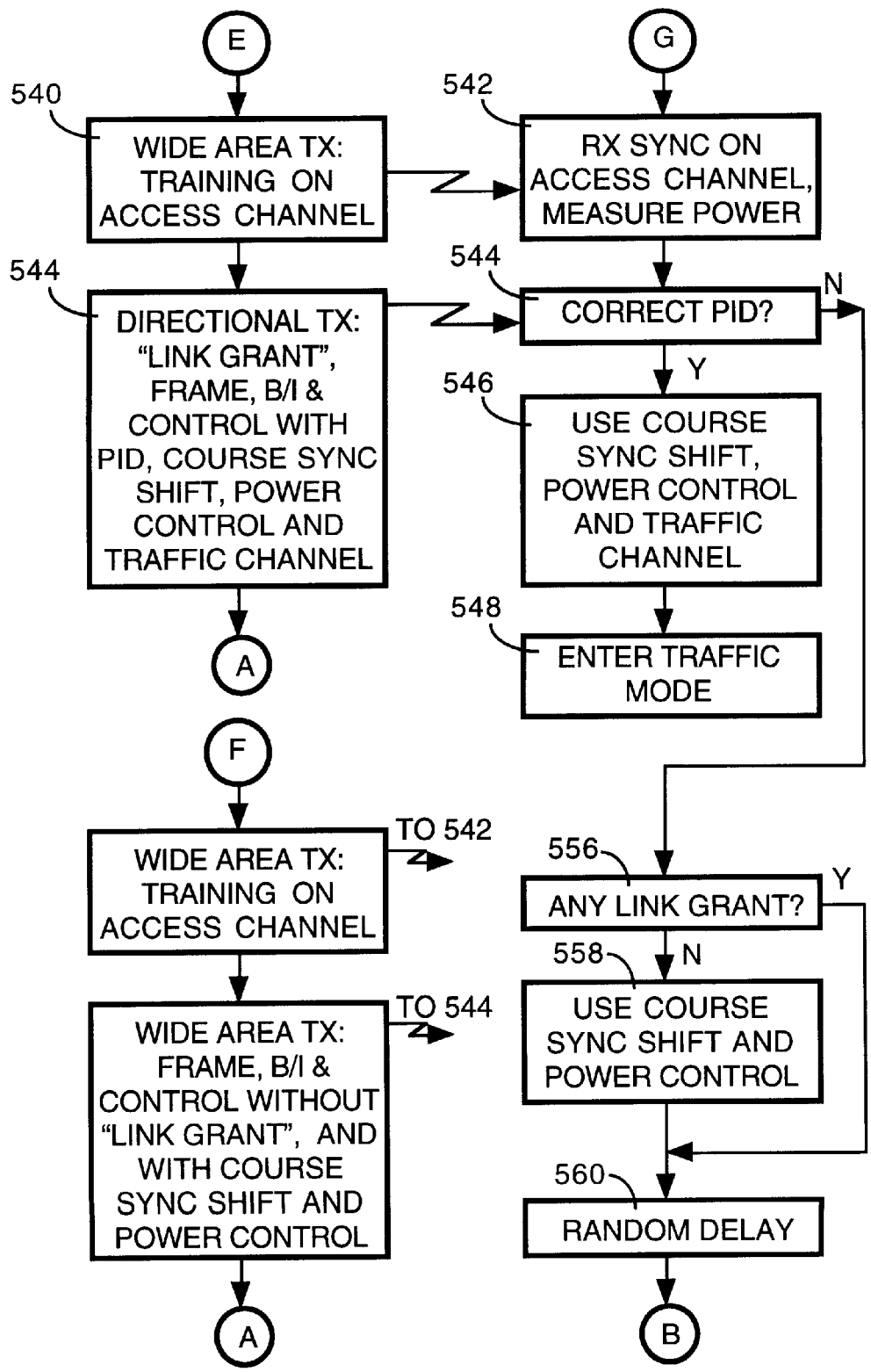

From step 534, the process of the base station proceeds through connector "E" to FIG. 8, which indicates processes in a subsequent DTS frame, step 540 again transmits the training signal. The remote terminal proceeding from step 526 through connector "G" to step 542 to again receive the training signal on the access channel. Then in step 544, the base station transmits a directional link grant signal on the access channel, the direction being determined in response to the spacial estimate of step 534. Alternatively, the link grant signal can be omnidirectional. The link grant signal includes a frame, B/I and a control signal having a PID of a remote terminal, course sync shift and power control signals and an index of a traffic channel to be used by the remote terminal. If in step 545 the PID received by the remote terminal matches the PID assigned to the remote terminal, then the remote terminal uses the course sync shift and power control signals and the traffic channel communicated by the base station. And the remote terminal enters the traffic mode at step 548.

An exception is the process of handling a priority call originated at the remote terminal when no traffic channels are available. Step 544 then transmits a link grant signal but provides a channel index corresponding to the access channel, preferably index zero. In response to which the remote terminal recognizes the index of zero and remains monitoring the access channel in interim DTS frames until the base station, in step 544, transmits a link grant signal assigning the remote terminal to an available traffic channel. In the interim DTS frames, the base station may actively terminate a low priority call to make a traffic channel available for the priority call. Methods of determining a low priority call include prioritizing calls relative to length of call, and assigning a lower priority to longer calls. Or based upon a predetermined priority assigned to remote terminals or destinations coupled through the traffic channels, or the type of information communicated where FAX information could have highest priority, and voice a lower priority, and low content voice have large silent times having the lowest priority.

Alternately, the process of the base station proceeds through connector "F" of FIG. 7 to again transmit a training signal 550 which is processed by the remote terminal in step 542. Thereafter at step 554, because the link request was partially detected at step 536, the base station continues transmitting the access channel in the wide area mode including frame and B/I information, the control signal is sent without a "link grant" signal, this is indicative of the partial detection, and sends a course sync shift and power control in response to the sync 1 signal selected at step 530. The access channel signal of step 554 is received by the remote terminal at step 545. If the transmission, received at step 545 is by either step 554 or step 544, had the PID of another remote terminal, then the remote terminal proceeds to step 556 to determine if a link grant signal was sent. If not, the transmission was from step 554 and the remote terminal uses the course sync shift and power control signals of step 554 in the next attempt to establish communication at step 518. Note that the use of power control at step 536 is optional and not essential and an alternative embodiment may have no estimation of power control in which case the remote terminal would not perform a power adjustment in response to step 536. If a link grant not intended for the remote terminal is received at step 544, then the sync shift and power control information is ignored and link establishment remains pending at the next execution of either step 508 or 510. From either step 556 or 558, a random number of frames are delayed at step 560 before a subsequent attempt is made to establish communications between the remote and base station by a subsequent execution of step 502 through connector "B". The base station returns from either steps 544 or 554 to step 500 through connectors "A" to continue generating DTS access channels.

Figure 9:
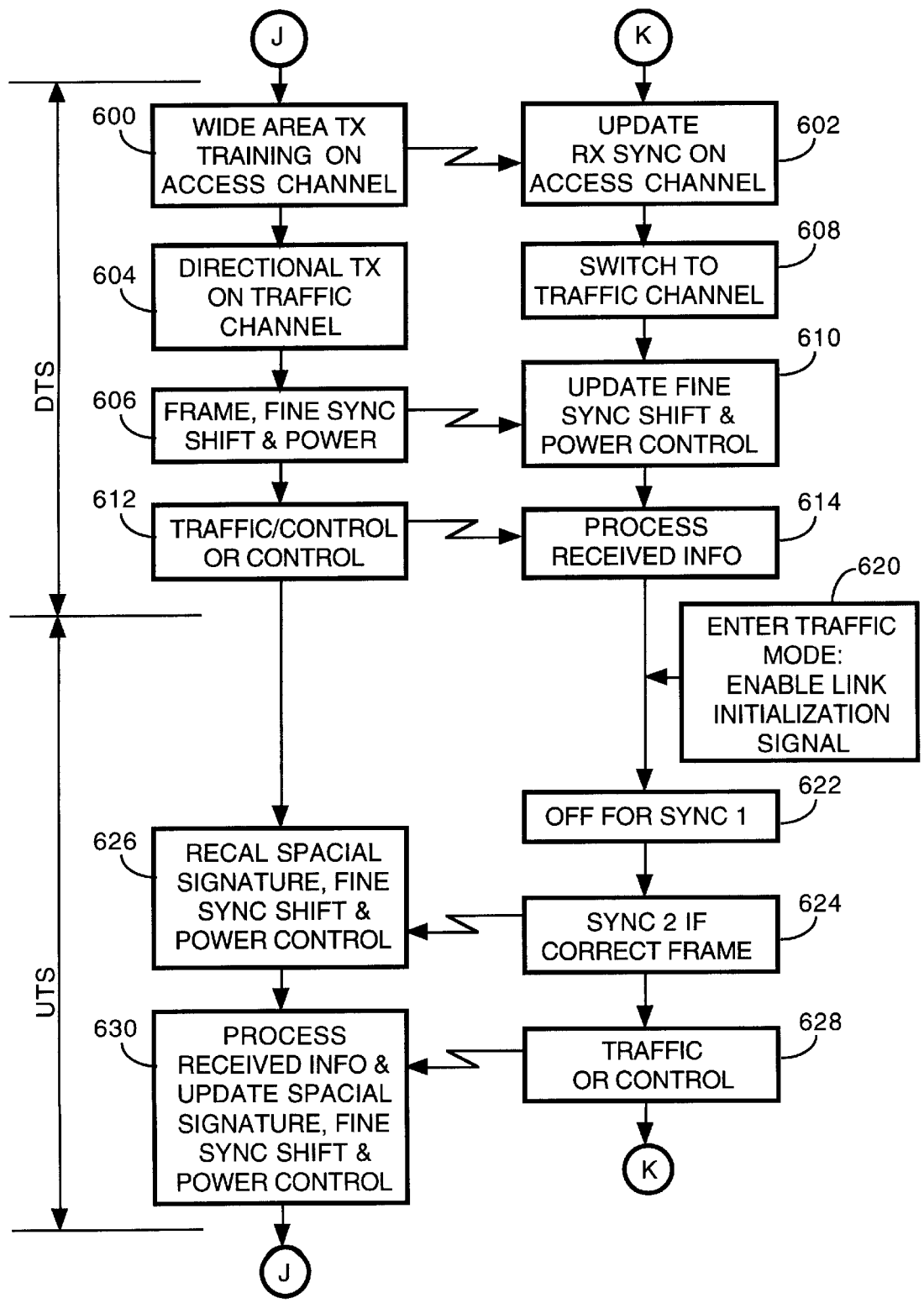

FIG. 9 shows the operation of the base station and the remote terminal communicating on a traffic channel. Steps 600–614 represent a DTS frame and steps 620–630 represent a UTS frame. The base station, in step 600 transmits a training signal on the access channel, and the remote terminal receives the training signal on the access channel in step 602. Step 600 corresponds to steps 500 and 540, while step 602 corresponds to steps 502 and 542. The base station then enables the traffic channel and the corresponding beam forming at step 604. Then the frame number, fine sync shift and power control is transmitted at step 606. The remote terminal switches from processing the access channel to processing the traffic channel assigned to the remote terminal at step 608. At step 610 the fine sync shift and power control is received and readied for use in the next UTS transmission. Thereafter in step 612 the base station transmits the traffic information or control information, which is received and processed by the remote terminal at step 614.

A remote terminal enters the traffic mode from step 548 of the access mode at step 620. At step 620 the remote terminal is configured to send a link initialization signal in the first UTS frame. From either step 614 or 620, the remote powers the transmitter off during sync 1 at step 622. This has the advantage of allowing the remote terminals to attempt to access the base station in any UTS frame during sync 1 at step 520 without interference from remote terminals on the traffic channels. Step 624 checks if the frame number of the current UTS frame corresponds to a signal indicative of a frame number assigned to the remote terminal by the base station. Preferably an index signal in the link grant signal from the base station indicates both the code channel and frame number to be used in the traffic mode. If there is no match, the remote terminal keeps the transmitter powered off during sync 2. If there is a match then the remote terminal powers on the transmitter and transmits a sync 2 signal. This method assures that only one remote terminal transmits a sync 2 signal at a time. This has the advantage of enabling improved spacial estimates, sync shift and power control by the base station during sync 2, step 626, because interference from transmissions by other remote terminals is significantly reduced during sync 2. Then the remote terminal transmits corresponding traffic or control information at step 628. This is received and processed by the base station at step 630. At step 630 the base station also updates the spacial signature, sync shift and power control, albeit with some interference from other remote terminals concurrently transmitting on other traffic channels at step 628. Thereafter, the base station returns to step 600 though connector "J" and the remote terminal returns to step 602 through connector "K" to begin again with a DTS frame.

An advantage should be noted that reduced interference of the sync 2 signal is also helpful in resolving a problem with a remote terminal that is loosing synchronization with the base station on the UTS frames. If the timing of the UTS traffic signal is beyond a certain detection range, but for the sync 2 signal, the base station could measure the traffic signal as low in power at step 606 when in fact the signal has the correct power but incorrect sync shift. In response the base station could erroneously signal the remote terminal to increase the transmission power. The increased power increases the interference with transmissions received from other remote terminals, in which case the base station could signal the other remote terminals to also increase their transmit power. Eventually this builds into an undesirable situation where remote terminals are transmitting with excessive power. The sync 2 transmission control in accordance with the present invention helps resolve this problem by reducing the interference when measuring each remote terminal. Furthermore, since only one of the thirty one access channels is being processed, additional DSP resources are available to increase in ability to detect remote terminals going out of sync than may be available when processing access or control information sent at step 628 by multiple remote terminals.

FIGS. 4 and 6 through 9 show a communication system having a plurality of frames 304 and 308 for communication from a plurality of remote terminals to a base station on a common carrier having a plurality of concurrent code channels, each frame having a first portion corresponding to sync 1 364 and empty 384 for first synchronization, a second portion for second synchronization corresponding to sync 2 386 and empty 366, and a third portion corresponding to signals 370, 395 and 397 for communicating information from the remote terminals to the base station. A method in a remote terminal comprising the steps of: acquiring a CDMA communication channel with the base station by, enabling the transmitter at step 520 and communicating a first synchronization signal during the first portion, disabling the transmitter at step 524 during the second portion, and enabling the transmitter at step 526 and communicating information including an identification signal unique to the remote terminal in the third portion; and in response to a signal at step 544 from the base station granting a CDMA communication channel, maintaining the communication channel by, disabling the transmitter at step 622 during the first portion, enabling the transmitter at step 624 and communicating a second synchronization signal during the second portion, and enabling the transmitter at step 628 and communicating message information during the third portion.

FIGS. 4 and 6 through 9 show a communication system having a plurality of frames 304 and 308 for communicating traffic information from a plurality terminals to a base station on a plurality of concurrent code channels having a common carrier frequency, each frame having a first and second portion corresponding to sync 1 364 and sync 2 386. In the base station a method of improving a spacial signature estimate for each of the remote terminals comprising the steps of: enabling transmission of a synchronization signal by a first remote terminal in the first portion of a first frame at step 544 and 606; inhibiting transmission of a synchronization signal by a second remote terminal in the first portion of the first frame, such as a second terminal concurrently executing step 622 while the first terminal is executing step 520; and estimating a spacial signature for the first remote terminal during the first portion of the first frame at step 534.

Figure 10:
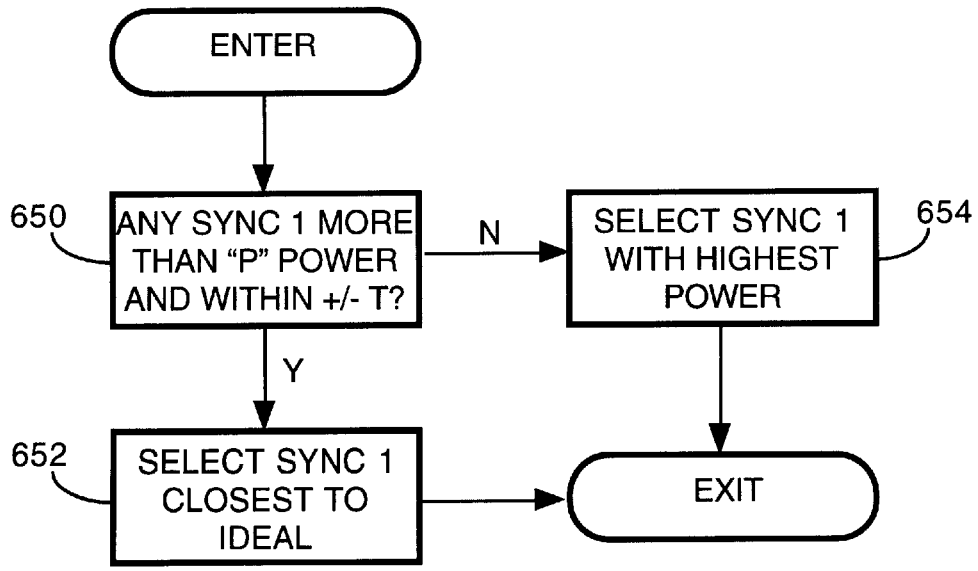
Figure 11:
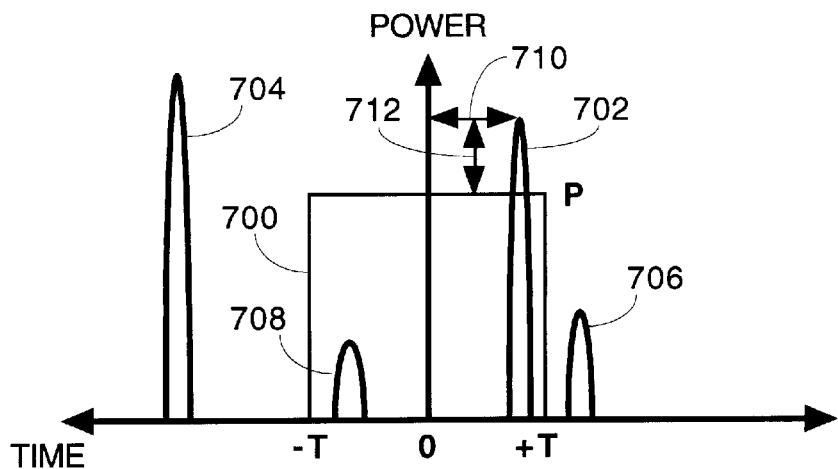
FIG. 11 illustrates relative timing and power levels used for selecting one of several concurrent sync 1 signals in accordance with the present invention.
Figure 12:
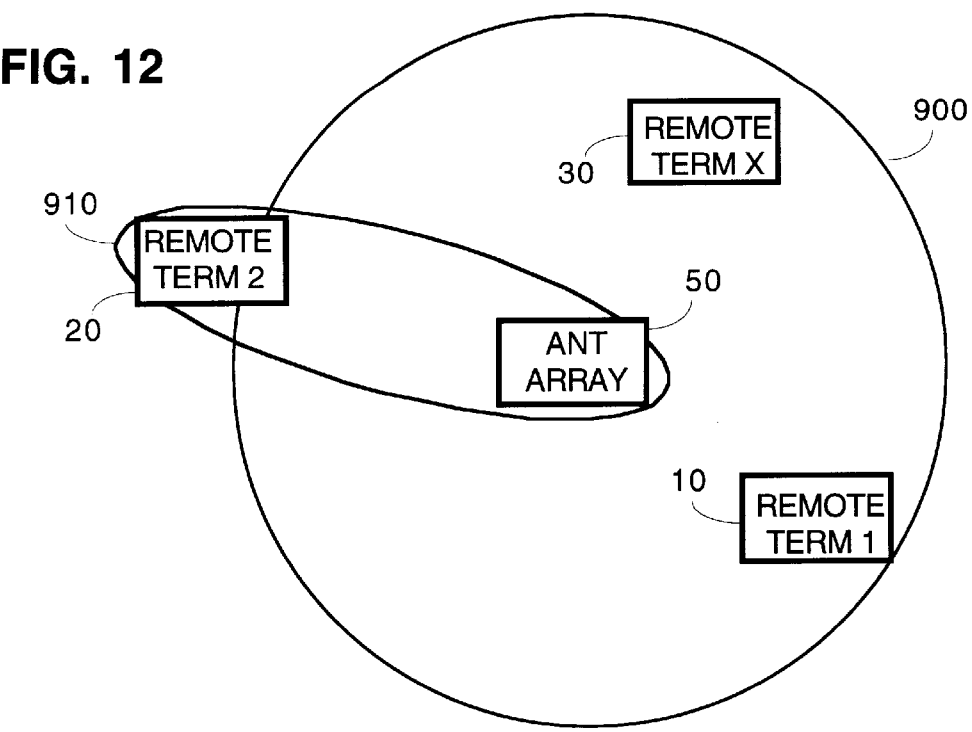
FIGS. 12 and 13 show various wide area and directional radiation patterns of a base station operation in accordance with the present invention.

FIG. 10 shows a flow chart representing selection of an optimal sync I reception of step 530. FIG. 11 illustrates relative timing and power levels used for selecting one of several concurrent sync 1 signals in accordance with the present invention. At step 650 a check is made of all sync 1 signals received, each sync 1 signal received is measured relative to received power and timing of reception. FIG. 12 shows four received sync 1 signals of various power level and timing, 702, 704, 706 and 708. Rectangle 700 represents an power/time area above which a sync 1 signal is desirable. Sync 1 signal 702 is above the desirable level P within the desirable time, −T and +T, and would be selected by step 650 of FIG. 11 at step 652. If signal 702 were not present, then since no other signals are above rectangle 700, signal 704 would be selected at step 654 because it has the highest power. If signals 702 and 704 were not present then signal 706 would be selected at step 654 because it has the highest power. If signals 702, 704 and 706 were not present then signal 708 would be selected at step 654. After selection, the timing offset of the selected signal may be used to further process the link request signal sent by the selected remote at step 525. If signal 702 were present, then the sync shift signal would have a magnitude represented by arrow 710 which would place timing of the received signal at an optimal, and the power control signal would have a magnitude represented by arrow 712 which would place the power of the received signal at a determined optimum power. It should be noted that a similar method may be used to determine the sync shift and magnitude of each traffic channel received by the base station.

Figure 13:
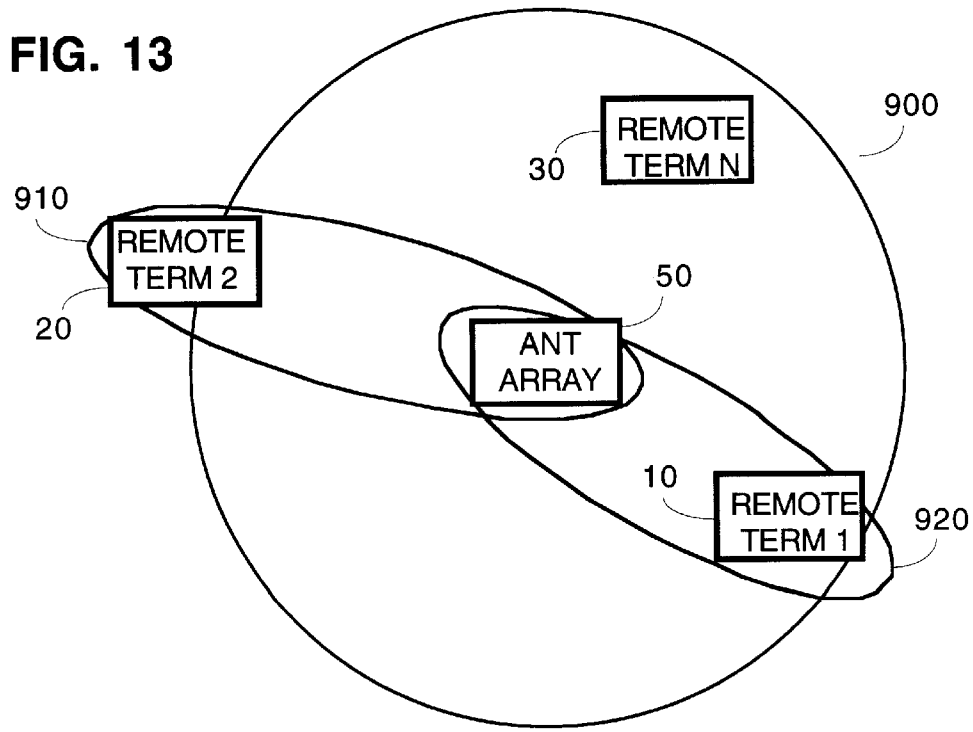

FIGS. 12 and 13 show various wide area and directional radiation patterns of a base station operation in accordance with the present invention. FIG. 12 shows an antenna array of the base station 50 in communication with remote terminals 10, 20 and 30. In a DTS frame, the antenna array transmits a wide area training signal having a radiation pattern corresponding to circle 900. Thereafter, a wide area link access signal having a paging signal with a PID corresponding to remote terminal 10. Concurrently with transmission of the wide area link access signal 900, the base station transmits a directional traffic signal 910 to remote terminal 2, 20 in order to facilitate a conversation between the user of remote terminal 2 and a destination. Advantageously, in the DTS frame of FIG. 12, the base station concurrently transmits a wide area access channel and a directional traffic channel.

FIG. 12 shows a communication system for communicating information from a base station on a plurality of concurrent code channels modulated upon a common carrier frequency to a plurality of remote terminals, a base station having an antenna array 50 for selectively directing transmission of the code channels. A method comprising the steps of wide area transmitting an access signal 900 modulated upon a first of the plurality of code channels, and directionally transmitting a traffic signal 910 modulated upon a second of the plurality of code channels.

FIG. 13 shows the antenna array of the base station 50 in communication with remote terminals 10, 20 and 30 in a subsequent DTS frame. The antenna array transmits a wide area training signal having a radiation pattern corresponding to circle 900 on the access channel. Thereafter a directional link grant signal 920 is transmitted to terminal 10 on the access channel. Concurrently with transmission of directional signal 920, the base station transmits a direction traffic signal 910 to remote terminal 2. Thus, in the DTS frame of FIG. 14, the base station concurrently transmits a wide area training signal during a first portion of the access channel and switches from wide area to a direction link grant signal during a second portion of the access channel.

Therefore what is provided includes a smart antenna CDMA communication system which provides for a common frequency for both uplink and downlink communication and which enables improved spacial estimations of a remote terminal in order to improve the directional characteristics of a smart antenna. The communication system provides synchronous CDMA communication on both the uplink and downlink communication channels without adding significant cost or bandwidth to the communication system. The CDMA communication system provides for rapid establishment of a communication link between a remote terminal and a base station and efficiently addresses recovery from collisions. Furthermore, the communication system which reduces the channel capacity used to synchronize a remote terminal once a link is established.

We claim:

1. In a communication system having a plurality of frames for communication from a plurality of remote terminals to a base station on a common carrier having a plurality of concurrent code channels, each frame of the plurality of frames having a first portion, a second portion, and a third portion, a remote terminal comprising:

a controller for controlling operation of the remote terminal in an access mode and a traffic mode;

a first synchronization generator responsive to said controller for generating a first synchronization signal;

a second synchronization generator responsive to said controller for generating a second synchronization signal;

a data modulator responsive to said controller for generating modulated information signals; and a transmitter coupled to said first synchronization generator, said second synchronization generator and said data modulator for generating a radio frequency modulated transmit signal indicative of the first and second synchronization signals and the information signals in response to said controller, wherein, in the access mode, said controller enables said transmitter and said first synchronization generator in the first portion, disables said transmitter in the second portion, and enables said data modulator and said transmitter in the third portion during a first frame of the plurality of frames, and in the traffic mode, said controller disables said transmitter in the first portion, enables said transmitter and said second synchronization generator in the second portion, and enables said transmitter and said data modulator in the third portion during a second frame of the plurality of frames subsequent to the first frame.

2. The remote terminal according to claim 1 further comprising a receiver responsive to said controller for receiving base station information signals from the base station, wherein said controller switches from the access mode to the traffic mode in response to a link grant signal included within the base station information signal.

3. The remote terminal according to claim 2 further comprising:

a user information input means responsive to said controller and coupled to said transmitter for receiving information from a user of the remote terminal and for generating user information signals in response thereto, wherein said data modulator generates modulated information signals uniquely identifying the remote terminal in response to the acquisition mode, and generates modulation information signals indicative of the user information signals in response to the traffic mode.

4. The remote terminal according to claim 2 further wherein said receiver generates a received power signal indicative of the power level of a training signal received from the base station, and further comprises a synchronization shift adjustment means responsive to said controller and coupled to said receiver and said first synchronization generator for adjusting a timing of transmission of the first synchronization signal with the first portion in response to the received power signal.

5. The remote terminal according to claim 2 wherein the base station information signals include a frame number signal uniquely identify each frame as one of set of periodically repeating frames, wherein during the access mode, said controller inhibits said transmitter if the frame number signal of the first frame does not match a predetermined value.

6. The remote terminal according to claim 5 wherein said controller further includes a personal identification signal uniquely assigned to the remote terminal, and wherein the predetermined value is a function of the personal identification signal.

7. The remote terminal according to claim 5 wherein the predetermined value is a function of a signal received from the base station in a prior operation of the traffic mode by the remote terminal.

8. The remote terminal according to claim 2 wherein the base station information signals include a frame number signal uniquely identify each frame as one of set of periodically repeating frames, wherein during the traffic mode, said controller inhibits said transmitter during the second portion if the frame number signal of the second frame does not match a predetermined value.

9. The remote terminal according to claim 8 wherein the predetermined value is one of a plurality of predetermined values chosen in response to an index signal received within the base station information signals.

10. The remote terminal according to claim 1 wherein said transmitter further comprises a spreading code modulator for increasing bandwidth of signals coupled into said transmitter, wherein said spreading code modulator spreads the transmitted signal in accordance with a first and a second spreading code signal during the access and traffic modes, respectively, wherein the first spreading code signal is predetermined and the second spreading code signal is selected in response to an index signal received within the base station information signals.

11. In a communication system having a plurality of frames for communication from a plurality of remote terminals to a base station on a common carrier having a plurality of concurrent code channels, each frame of the plurality of frames having a first portion for first synchronization, a second portion for second synchronization, and a third portion for communicating information from the plurality of remote terminals to the base station, a method in a remote terminal comprising the steps of:

acquiring a first of the plurality of code channels with the base station by,
enabling a transmitter within the remote terminal and transmitting a first synchronization signal during the first portion,
disabling the transmitter during the second portion, and
enabling the transmitter and transmitting access information including an identification signal unique to the remote terminal in the third portion; and in response to a signal from the base station granting the first code channel, maintaining the first code channel by,
disabling the transmitter during the first portion,
enabling the transmitter and transmitting a second synchronization signal during the second portion, and
enabling the transmitter and transmitting message information during the third portion.

12. The method according to claim 11 further comprising the step of:

determining a received power level of a synchronization signal received from the base station; and said step of acquiring further comprises the step of shifting synchronization timing of the access information in response to the received power level, and said step of maintaining further comprises the step of shifting synchronization timing of the message information in response to a sync shift signal received from the base station and addressed to the remote terminal.

13. The method according to claim 12 wherein:

said step of acquiring further comprises the step of adjusting a power output of the transmitter in response to the received power level, and said step of maintaining synchronization further comprises the step of adjusting the power output level of the transmitter in response to a power control signal received from the base station and addressed to the remote terminal.

* * * * *